United States Patent
Elff

(10) Patent No.: US 12,526,600 B2
(45) Date of Patent: Jan. 13, 2026

(54) REAL-TIME SOUND FIELD SYNTHESIS BY MODIFYING PRODUCED AUDIO STREAMS

(71) Applicant: Little Dog Live LLC, New Paltz, NY (US)

(72) Inventor: Jody Elff, New Paltz, NY (US)

(73) Assignee: Little Dog Live, LLC, New Paltz, NY (US)

( * ) Notice: Subject to any disclaimer, the term of this patent is extended or adjusted under 35 U.S.C. 154(b) by 334 days.

(21) Appl. No.: 18/114,137

(22) Filed: Feb. 24, 2023

(65) Prior Publication Data

US 2023/0276189 A1 Aug. 31, 2023

Related U.S. Application Data

(60) Provisional application No. 63/314,197, filed on Feb. 25, 2022.

(51) Int. Cl.
| | |
|---|---|
| *H04S 7/00* | (2006.01) |
| *H04N 7/00* | (2011.01) |
| *H04N 7/52* | (2011.01) |
| *H04N 21/2187* | (2011.01) |
| *H04N 21/233* | (2011.01) |
| *H04S 3/00* | (2006.01) |

(52) U.S. Cl.
CPC ............ *H04S 7/304* (2013.01); *H04N 7/002* (2013.01); *H04N 7/52* (2013.01); *H04N 21/2187* (2013.01); *H04N 21/233* (2013.01); *H04S 3/008* (2013.01); *H04S 2400/01* (2013.01); *H04S 2400/13* (2013.01); *H04S 2420/11* (2013.01)

(58) Field of Classification Search
CPC ........ H04S 7/304; H04S 3/00; H04S 2400/01; H04S 2400/13; H04S 2420/11; H04S 2420/01; H04S 7/00; H04S 3/008; H04N 7/002; H04N 7/52; H04N 21/2187; H04N 21/233; H04N 7/00; H04R 2201/401; H04R 1/406
See application file for complete search history.

(56) References Cited

U.S. PATENT DOCUMENTS 9,706,292 B2    7/2017  Duraiswami et al.

FOREIGN PATENT DOCUMENTS

| CA | 3044260 | * 5/2019 | ............... H04S 7/00 |
| WO | WO2019/193244 | 10/2019 | |

OTHER PUBLICATIONS

International Search Report and Written Opinion for PCT/US2023/013881, mailed Jun. 27, 2023, 14 pages.

* cited by examiner

*Primary Examiner* — Yosef K Laekemariam
(74) *Attorney, Agent, or Firm* — Brownstein Hyatt Farber Schreck, LLP

(57) ABSTRACT

A client device is disclosed that receives, from a server, a live video stream and a production quality live ambisonic audio stream generated during performance of a live event at a venue. The live ambisonic audio stream is generated from audio channels captured by audio capture devices disposed at the venue. The audio channels captured at the event, and modified by a producer, can be compared to audio captured by an ambisonic microphone positioned within the event space to determine the phase and relative amplitude of those channels as received by a particular ambisonic microphone channel. In this manner, raw and/or produced audio channels captured at the event can be shifted and mixed together to generate a production quality ambisonic stream.

19 Claims, 9 Drawing Sheets

REAL-TIME SOUND FIELD SYNTHESIS BY MODIFYING PRODUCED AUDIO STREAMS

CROSS-REFERENCE TO RELATED APPLICATION

This application is a non-provisional and claims the benefit under 35 U.S.C. § 119(e) of U.S. Provisional Patent Application No. 63/314,197, filed Feb. 25, 2022, the contents of which are incorporated herein by reference as if fully disclosed herein.

TECHNICAL FIELD

Embodiments described herein relate to systems and methods for producing a sound field in real time by modifying audio streams, and in particular, to modifying multi-channel audio streams captured at a live event to generate an n-order ambisonic audio stream that can be streamed to, and received by, a remote attendee of the live event.

BACKGROUND

The audiovisual experience of an attendee at a live event is unique, in part, as a result of the venue itself and the attendee's position within the venue. When a live event is streamed to a remote attendee, however, multi-channel audio captured at the event is typically professionally mixed on site to studio quality and thereafter transmitted over a network to the remote attendee, offering a different, and often less engaging, experience to the remote attendee.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The disclosure will be readily understood by the following detailed description in conjunction with the accompanying drawings, wherein like reference numerals designate like structural elements.

The use of the same or similar reference numerals in different figures indicates similar, related, or identical items.

Figure 1A:
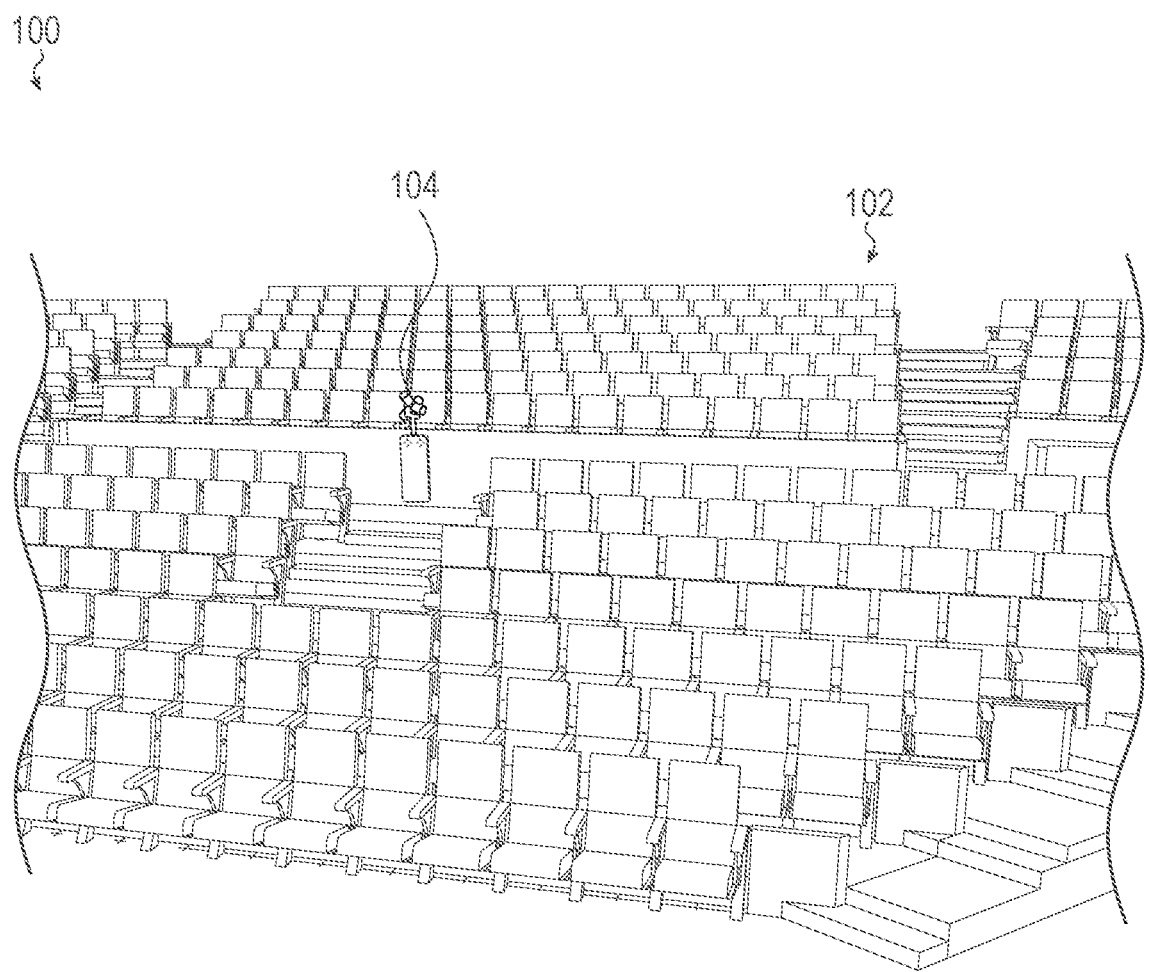
FIGS. 1A-1B depict an example host venue environment including an omnidirectional imaging system, as described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to systems and methods for offering a remote attendee of a live event an audiovisual experience similar to an in-person attendee of the same event.

In particular, embodiments described herein include a system including an omnidirectional camera for capturing a wide field of view of a live event. The omnidirectional camera is positioned at a location within a venue hosting the event. The system further includes an ambisonic microphone for capturing a sound field of the location. The ambisonic microphone can include an array of individual microphones and can be suitably configured to record any suitable ambisonic order. Output from the captured ambisonic microphone is used, in effect, as a phase and amplitude sensor in respect of individual channels of captured audio recorded by other audio capture devices placed at the same event (e.g., microphones, pickups, and so on).

More specifically, output of the ambisonic microphone is used to determine and apply appropriate phase shifts, amplitude modifications, and/or mixing of raw and/or produced (already-mixed, studio-quality) live audio channels to generate a production quality ambisonic stream that can be transmitted with video output of the omnidirectional camera to a remote attendee. The remote attendee may operate a virtual reality (VR) headset or other place-shifting apparatus to view the camera feed and to hear the production quality ambisonic stream. The apparatus worn or used by the remote attendee can, optionally, modify a cropping or field of view of the camera feed based on a head position of the remote attendee. In addition, the apparatus worn or used by the remote attendee can, optionally, further modify the production quality ambisonic stream to convey a spatially-varying audio impression to the remote attendee.

More simply, a VR headset can modify the production quality ambisonic stream and/or the video stream such that when the remote attendee moves their head, audio and video information presented to the attendee likewise changes, thereby evoking an audiovisual proprioceptive sensory impression of being physically present within the venue at the location at which the ambisonic microphone and omnidirectional camera system is placed.

More generally, output from an omnidirectional camera (and/or wide field of view camera) as described herein is streamed, over one or more networks (including the open Internet) to virtual reality headset worn by a remote attendee of the event.

The headset worn by the remote attendee can crop, zoom, and/or translate the received omnidirectional camera stream based on a head position of the remote attendee, which may be determined by the headset or another electronic device (e.g., cellular phone, motion capture sensor, and so on) by leveraging one or more position/orientation sensors such as a gyroscope, a magnetometer, an accelerometer, and so on.

As a result of this construction, as the remote attendee moves or repositions his or her head in space, that remote attendee may perceive a correspondingly different view of the venue and live event, as captured by the omnidirectional camera system placed within the venue.

In many cases, the omnidirectional camera system may include multiple imaging elements. For example, in an embodiment, two separate and discrete omnidirectional camera systems may be positioned adjacent to one another (e.g., separated by a distance similar to the separation of between eyes of the remote attendee) such that the remote attendee receives a different perspective of the venue for each eye; as a result of this construction, the remote attendee may be able to perceive depth similar to an in-person attendee.

In other embodiments, a wide field of view camera or set of cameras may be used. In some cases, one or more camera feeds may be stitched together (either onsite, by a networked service such as a cloud service, or at a remote location) to form a single video stream.

In addition, as noted above, some embodiments described herein relate to mixing and/or modifying multi-channel audio output captured at the live venue (e.g., from one or more microphones, pickups and so on) to generate an ambisonic audio stream for the remote attendee that changes based, at least in part, on the position and orientation of the headset worn by the remote attendee.

For example, in many embodiments, an ambisonic microphone can be positioned within a venue during a live event. In many cases, the ambisonic microphone may be a microphone array with individual microphones oriented in different relative orientations (e.g., right, left, up, down, and so on) and may be configured to output an ambisonic-formatted set of channels representing a sound field that may be experienced by a listener seated at the location of the ambisonic microphone.

The ambisonic microphone may be configured to provide output of any suitable ambisonic order. As one example, in one embodiment, the ambisonic microphone may be a first order ambisonic microphone, configured to output five channels. In this example, a first channel may be an every direction channel, a second channel may be a right side channel, a third channel may be a left side channel, a fourth channel may be an above channel, and a fifth channel may be a below channel. Each of these channels may correspond to a respective one or more microphones of the ambisonic microphone array.

In other examples, the ambisonic microphone array can include more microphones associated with angular positions and/or relative orientations different from higher order ambisonic arrangements. A person of skill in the art may readily appreciate that any suitable order of ambisonic sound field capture can be used. For simplicity, a first order ambisonic capture is described in reference to the embodiments that follow, but it may be appreciated that this is merely one example.

In some embodiments, the ambisonic output of the ambisonic microphone may be streamed alongside the captured video referenced above. In these examples, the ambisonic stream may be received by an electronic device of the remote attendee alongside and/or synchronized with the video stream. In these embodiments, the ambisonic stream may be modified by the remote attendee's device to spatially shift with movement of the attendee's head so that the relative orientation of the attendee's head changes relative to the relative positions of each channel of the ambisonic stream.

Phrased in another manner, the attendee's device may manipulate phase and/or amplitude of the ambisonic stream in a manner corresponding to the movements of the attendee's head, which in turn may also cause a current view/frame of the streamed video to change. More simply, the ambisonic stream combined with the video stream can create a sensory impression within the remote attendee of attending the live event in person; both audio and video perceivably move with the attendee as the attendee shifts position.

However, as may be appreciated by a person of skill in the art, an ambisonic microphone array may present a subpar listening experience when compared against an in-person attendance. Accordingly, embodiments described herein relate to systems and methods for producing an ambisonic stream, in real time, from the professionally produced audio channels captured at the event by the audio capture devices placed within the event space for local amplification and/or recording.

More specifically, as with many professionally produced live events, sound produced by audio sources at the event may be captured by respective audio capture devices (e.g., microphones, pickups, and so on). These channels (of which there may be hundreds) are collected and aggregated at an audio workstation, which may be used by a producer to generate a set of output channels that are professionally produced. These output channels can be rebroadcast at the venue for an enhanced experience (e.g., via a PA system or other sound system installed at the venue), or may be streamed to a remote location. In other cases, the produced audio can be recorded for replay at a later time.

In these embodiments, the produced audio stream is entirely in phase—all instruments, microphones, and other audio capture devices are in sync with one another. As known to a person of skill in the art, this synchronization is ideal for recordings, but does not convey any spatial information to listeners of the recording (or stream).

Accordingly, embodiments described herein relate to creation of an ambisonic stream from audio captured at an event and/or output channels mixed by a professional producer.

In many embodiments, output from different channels of the ambisonic microphone placed within the venue can be cross correlated with individual channels of audio captured at an event space so that specific phase delays and relative amplitudes (and/or resonance characteristics) can be determined. Thereafter, this channel-specific phase, amplitude, and/or resonance information can be used to modify the venue-captured audio channels to create a professionally produced ambisonic audio stream which, in turn, can be streamed to a remote attendee.

For example, a symphony places different instrument groups at different physical locations on a stage. As a result, different sound produced by these different instruments reaches an in-person attendee at slightly different times, both from the right and left directions but also from above and below (e.g., due to venue-specific echoes and/or resonance properties). For example, a violin at stage right and a cello at stage left arrive at an in-person attendee sitting stage left at slightly different times, giving the impression to that attendee that the cello is physically closer than the violin.

In an example, an ambisonic microphone, such as described above, can be placed in a seat within the venue at stage left. At this position, the ambisonic microphone array can capture the sound field associated with that location.

Specifically, side channels of the audio captured by the ambisonic microphone array may record cello and violin input slightly out of phase with respect to left and right, but may record the cello and violin closer in phase from an "above" location, as the distance each instrument's sound must travel to reflect from acoustic surfaces on the venue ceiling may be very similar.

The ambisonic microphone array can output five separate audio channels—(1) all directions, (2) right, (3) left, (4) front, and (5) back. In other cases, up and down may be channels as well, or in place of front and back. Each of these channels records the violin and cello at slightly different amplitudes and slightly different phase delay.

Each of these channels can be phase/amplitude compared in a suitable way (e.g., cross-correlation, as one example) to the raw captured audio from each of the cello or violin. In some cases, the ambisonic microphone array output channels can be compared to violin and cello channels that have been output from an audio workstation, although this is not required of all embodiments.

Specifically, by comparing the captured audio channels from each instrument to captured audio from the ambisonic microphone array, a phase and amplitude coefficient for each channel can be determined. Thereafter the captured audio channels can be delayed and attenuated automatically according to that channel's specific determined coefficients. Thereafter, the now-delayed and attenuated output signals can be mixed and/or further modified according to the settings determined by the audio producer (either on-site or remote), and combined/mixed to generate a fully-produced version of the respective captured ambisonic channel.

In this way, captured ambisonic audio can be used, in effect, as a probe or sensor, to inform generation of a production quality ambisonic stream capable to reproduce the proprioceptive and/or spatial effect of being physically present within a sound field at the location of the ambisonic microphone within the venue.

More broadly, in this manner, a remote attendee can enjoy a high quality audiovisual experience that changes, spatially, with movements of the remote attendee's head. In a more simple and non-limiting phrasing, the remote attendee can be provided with a visual experience of the live event that changes and/or is controlled by the remote attendee and, additionally, the remote attendee can be provided with an audio experience of the live event that changes and/or is controlled by the remote attendee. In this manner, the remote attendee is provided with an attendance experience substantially identical to that of an in-person attendee.

More generally, many embodiments described herein relate to methods of applying phase delays to one or more audio channels or audio streams of a set of produced or raw audio channels or raw audio streams corresponding to a unique audio receiver location during a live event at a venue. The unique audio receive location may thus correspond with a particular location where an ambisonic microphone is placed at the venue. Each of these phase delays may be selected and/or set based on the relative position of an omnidirectional camera system or an ambisonic microphone positioned within the venue. For example, audio channels sampled/captured from audio sources physically close to the omnidirectional camera system or the ambisonic microphone may be phase delayed to a smaller extent than to audio channels sampled/captured from audio sources physically more distant from the omnidirectional camera system or the ambisonic microphone.

As used herein, a "phase profile" may be applied to a set of audio channels, each audio channel being associated with a particular phase delay based at least in part on the distance and/or direction separating that particular associated audio source and an omnidirectional camera system or an ambisonic microphone positioned within the same venue. In some embodiments, the function of a manually or automatically generated phase profile can be provided by an inverse transfer function generated in respect of a transfer function respecting the acoustic behavior of the venue itself. As such, herein, phrases like "phase profile" and "transfer function" and similar are understood to interchangeably refer to the operation of synthesizing a production quality ambisonic stream from raw and/or produced/mixed channels captured at a live event, informed by output from an ambisonic microphone placed within the venue itself.

As may be appreciated by a person of skill in the art, by imparting phase delays in this manner, live audio (albeit captured by electronic audio capture devices) may be perceived by a remote attendee as being specific to the physical location of the omnidirectional camera system or the ambisonic microphone within the venue. In other words, if a second omnidirectional camera system or a second ambisonic microphone is positioned in a different location within the same venue, a different phase profile will be applied. In another non-limiting phrasing, operations associated with applying a phase profile to a set of audio streams or channels of an ambisonic audio stream may be referred to as "beamforming operations."

In many cases, at least two phase profiles may be applied for each omnidirectional camera system. In particular, a first phase profile associated with a virtual position of a first ear of a remote attendee and a second phase profile associated with a virtual position of a second ear of the same remote attendee.

The virtual position of each ear may be determined by sensor feedback provided by a virtual reality headset worn by that remote attendee. In these embodiments, movement of the remote attendee's head can cause the phase profiles applied to the multi-channel audio captured by an ambisonic microphone at the event to change; as the remote attendee repositions his or her head, his or her right ear—if positioned at the location of the omnidirectional camera system or the ambisonic microphone—may become physically closer to or more distant from particular audio sources within the venue.

As such, the phase delay associated with those audio sources may be increased or decreased, respectively. As a result of this construction, the remote attendee wearing a virtual reality headset may perceive a live streamed ambisonic audio stream of the live event in a similar way as if the remote attendee is physically present at the venue of the live event.

In addition to the foregoing, many embodiments described herein may correspond with methods for applying one or more transforms (which may be time-domain filters, frequency-domain filters, analog-domain filters, discrete/digital domain filters and/or any combination thereof or inverses thereof) to the attendee-head-position-specific, within-venue-location-specific phase-shifted multi-channel audio streams.

These transforms can impart, to these head-position specific multi-channel audio streams, characteristics specific to the particular venue (e.g., reverberation, attenuation, and so on) and/or specific to human ear geometry, thereby generating an ambisonic audio stream synthesizing a sound field at a particular location within the venue. More specifically, in many embodiments a "venue transfer function" may be applied to the phase-shifted audio streams to impart one or more venue-specific characteristics to those streams to impart, for the remote user, acoustic effects that result from geometry and/or particular architectural aspects of the particular venue. The particular architectural aspects may include a size of the venue, a seating capacity of the venue, material composition of walls and/or ceiling of the venue, and so on.

As a result of phase delay modification of one or more audio channels or audio streams of multiple audio channels or audio streams of an ambisonic audio stream, as described herein in accordance with some embodiments, a remote attendee wearing a virtual reality headset can experience ambisonic audio, that—despite being professionally produced/mixed and captured using audio capture devices—provides the remote attendee, an audio experience that is unique to a particular venue, and in particular, unique to a particular location within that venue, where the omnidirectional camera system or the ambisonic microphone is placed, as described herein above.

A person of skill in the art may appreciate that different phase profiles, different venue transfer functions, and/or different head-related transfer functions may be applied to multi-channel venue-captured audio to simulate different effects for a particular remote attendee. For example, in some cases, a user-specific head-related transfer function may be calculated and/or determined based on a three-dimensional scan of that particular user's head and ear geometry. In some cases, application of a head-related transfer function may not be required; microphones may be placed within ear canals of an ambisonic audio capture system head positioned nearby an omnidirectional camera system, as described above. In such cases, head movement may be used to impart a phase delay between the right and left channels transmitted to the remote attendee.

In yet other examples, a venue transfer function may not be required to be applied. For example, in cases in which a microphone is placed adjacent to and/or within an omnidirectional camera system (as described above), sounds captured by that microphone may already include effects imparted by the internal geometry and/or the particular venue-specific characteristic of the venue. The venue specific characteristics may include, for example, but not limited to, a size of venue, a shape of a venue, materials used in walls and/or ceiling of the venue, open space at the venue, a number of people that may attend a specific event at the venue, and/or a location of an attendee at a venue, and so on.

In some embodiments, one or more parameters of a venue transfer function or a head-related transfer function as described herein may be updated based on a configuration, which configuration may be predetermined and/or selectable by a user or a remote attendee. Accordingly, ambisonic audio experience of a remote attendee may be updated to give a remote attendee a unique audio experience corresponding to a particular venue.

These and other embodiments are discussed in greater detail herein. More generally and broadly, the embodiments described herein relate to systems and methods for providing a three-dimensional video and audio experience to a remote attendee of a live event in a manner that simulate the experience of attending that event in person. Further, the three-dimensional video and the ambisonic audio stream, which are live streamed to the remote attendee may or may not be synchronized with each other.

Further, it may be appreciated that the embodiments described herein can be leveraged by multiple remote attendees. More specifically, various method and system embodiments described herein are related to generating an ambisonic audio stream, modifiable by individual VR headsets, to provide each remote attendee a unique and attendee-specific audio experience for a given live event, which may be custom with respect to each remote attendee's unique cranial structure, venue preferences, and/or location of each respective omnidirectional camera system's or ambisonic microphone's location within the venue, and so on.

In other cases, multiple remote attendees can receive the same ambisonic audio stream, which may be (optionally) modified by each respective remote attendee's headset or other user electronic device to change based on head position of the remote attendee and/or cranial structure of a user of the particular headset or other electronic device.

The ambisonic audio stream, as described herein, may be an n-order ambisonic audio stream and include multiple audio channels. For example, a first-order ambisonic audio stream may include four channels, a second-order ambisonic audio stream may include nine channels, a third-order ambisonic audio stream may include sixteen channels, a fourth-order ambisonic audio stream may include twenty-five channels, a fifth-order ambisonic audio stream may include thirty-six channels, and so on.

More generally, it may be appreciated that the ambisonic audio effect, and/or the venue-specific effect, and/or the phase profile effect(s) imparted to an ambisonic audio stream may be applied by a venue-located electronic device, a remote electronic device, server or service (e.g., producer equipment, remote cloud platform, and so on) and/or by a device local to a particular remote attendee. In some cases, certain transforms may be applied on-site (e.g., at the venue), whereas other transforms may be applied off-site, such as in the cloud or at a user's electronic device.

For example, as noted above, various method and system embodiments described herein modify characteristics of one or more channels of an ambisonic audio stream using one or more venue-based transfer functions (VTFs) and/or one or more head-related transfer functions (HRTFs) to produce an ambisonic audio stream that is specific to a particular remote attendee and/or for a particular venue.

As described herein, a VTF may determine how each channel of multi-channel ambisonic audio stream would be affected with reference to other channels of the multi-channel ambisonic audio stream based on a venue-specific characteristic. The venue specific characteristics may include, for example, but not limited to, a size of venue, a shape of a venue, materials used in walls and/or ceiling of the venue, open space at the venue, a number of people that may attend a specific event at the venue, and/or a location of an attendee at a venue, and so on.

Each channel of the multi-channel ambisonic audio stream, therefore, may have a different phase delay (or phase shift), attenuation, reverberation and so on in comparison with other channels of the multi-channel ambisonic audio stream, and may arrive to different attendees at the venue differently and at a different time. The VTF may, in part, operate to modify one or more of each channel of multi-channel audio input.

As described herein, an HRTF may determine phase profile of each channel of multi-channel ambisonic audio stream as experienced by a remote attendee depending on a remote attendee's unique cranial structure features, such as shape and size of a remote attendee's ear, distance between a remote attendee's ears, and/or size and shape of an ear canal of the remote attendee, and so on.

Accordingly, each channel of multi-channel audio input may have a different phase delay (or phase shift), attenuation, reverberation and so on in comparison with other channels of the multi-channel ambisonic audio stream when sound from each channel may arrive at the remote attendee's eardrum. In this manner, an HRTF may operate to modify one or more channels of multi-channel ambisonic audio stream based on the remote attendee's unique cranial structure features.

In some embodiments, and by way of a non-limiting example, a machine-learning model may be used to determine one or more VTFs and/or one or more HRTFs. The machine-learning model may be generated using audio test data collected from a venue. In other cases, a known or determinable acoustic impulse response of a particular venue may be used.

In some cases, as noted above, binaural audio can be captured. For example, an audio capture system with anatomically accurate (e.g., material, shape, size, and so on) human ears can be fitted with two or more microphones, and placed in a venue. In some embodiments, a microphone may be placed within each ear of the audio capture system. As a result of this construction, audio received by each microphone, which is physically separated from each other by the structural features of the ambisonic audio capture system, may be perceived as being heard by a person. Such structure is not required of all embodiments.

In some embodiments, as noted above, an omnidirectional camera or a wide-field view camera (generally referred herein as a camera system) can be used to capture images from a particular perspective (e.g., a position of a particular audio capture system, such as described above) within a venue.

The camera system can be reflection-based (e.g., reflected from a spherical mirror surface), or lens-based and may include one or more discrete image capture devices or subsystems. In one example, images and/or videos taken using two or more than two lenses may be stitched together to create a contiguous visual environment, a viewport of which may be controlled by a position or orientation sensor of a virtual reality headset, such as described herein.

These foregoing and other embodiments are discussed below with reference to FIGS. 1-7. However, those skilled in the art will readily appreciate that the detailed description given herein with respect to these figures is for explanation only and should not be construed as limiting.

Figure 1B:
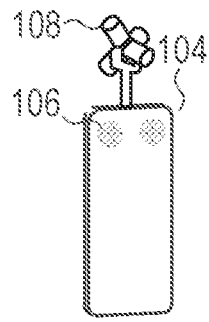

FIGS. 1A-1B illustrates an example host venue environment. A host venue 100 may be a location where a performance of a live event is taking place. The host venue 100 may include a seating area 102, where a number of attendees may be seated. As described herein, an ambisonic audio capture system 104 may be situated in the seating area 102. The ambisonic audio capture system 104 may be equipped with an omnidirectional imaging system 106 and/or one or more microphones oriented in different orientations directions such as the microphone array 108. The omnidirectional imaging system 106 may be used to capture an environment surrounding the ambisonic audio capture system 104. The microphone array 108 may be an n-order ambisonic microphone, as described herein, where n is 1, 2, 3, 4, or 5, and so on.

In some embodiments, the omnidirectional imaging system 106 used to capture an environment surrounding the ambisonic audio capture system may cover full spherical view, hemisphere, or full multiangle view from the ambisonic audio capture system's point of view. By way of a non-limiting example, the omnidirectional imaging system 106 may include one or more discrete subsystems or imaging systems, such as, using a single lens or fisheye lens system, one or more wide angle lenses, two lenses or dual fisheye system, or more than two lenses or imaging sensors. In one example, images and/or videos taken using two or more than two lenses may be stitched together.

As a result of this construction, the microphone array 108 can detect sound directed within the environment in different orientations, such as above and below, left side, right side, front, back, and so on. Different angles and orientations are possible; a person of skill in the art recognizes that an ambisonic microphone array can be constructed in a number of suitable ways and may vary from order to order, or embodiment to embodiment.

The microphone array 108 can be communicably coupled to a server system or other computing appliance so as to generate or otherwise determine phase profiles and/or transfer functions of each channel of captured audio captured at the event. Specifically, the microphone array 108 can include and/or may be communicably coupled to one or more audio processing appliances configured to retrieve, in real time or near real time, digital and/or analog information generated by the microphone array 108 in respect of sounds produced during a live event.

In many cases, the microphone array 108 can be temporarily placed within an environment, during which a phase profile and/or transfer function is determined. Thereafter, the microphone array 108 may be removed and/or disabled, as the phase profile and/or transfer functions are statically associated with particular locations with the venue. More generally, it may be appreciated that phase profile information as described herein may not be calculated in real time during a live event, but may instead be determined prior to an event during a configuration operation performed by, as on example, a venue's or event's audio producer.

Many configurations and constructions are possible.

Figure 2:
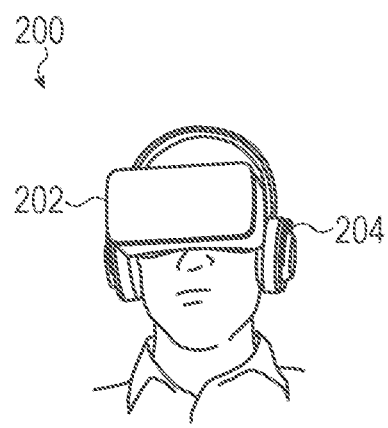
FIG. 2 depicts an example client-side environment.

FIG. 2 depicts an example client-side environment. For example, FIG. 2 shows a remote attendee 200 attending a live event using a headset 202. In some cases, the headset 202 may also include audio headset 204. The headset 202 may be communicatively coupled with a server streaming an ambisonic audio stream that is specific to a remote attendee, as described herein in accordance with some embodiments, and for example, using FIGS. 1A-1B, above. The headset 202 may be communicatively coupled with the server via a home network, such as a local area network (LAN).

As described herein, the remote attendee would have a visual experience consistent with the attendee's movement, for example, the remote attendee's head movement and/or movement from one orientation to another orientation. If the remote attendee would turn his head up, the visual displayed to the remote attendee would change according to the remote attendee's movement. Similarly, if the remote attendee moves forward, the visual displayed to the remote attendee would change as well according to the remote attendee's movement from one location to another location in the room.

Similarly, as described herein, one or more VTFs, and/or phase profiles may operate to modify phase profile of, or effect overlaid upon, one or more channels of multi-channel ambisonic audio stream before modifying a production quality ambisonic audio stream transmitted to the remote attendee's headset 202. More generally, the headset 202 may further modify phase profile of, or effect overlaid upon, one or more channels of multi-channel ambisonic audio stream in accordance with head position, user preferences, HRTFs, and so on. Accordingly, the remote attendee would have an audio experience that is unique to the remote attendee and consistent with, and synchronized with, the remote attendee's visual experience.

In particular, in many embodiments, video data streamed to the remote attendee may be delayed so as to maintain synchronization with audio data. In other cases, video may lag audio and opposite synchronization operations may be required. However, in some cases, the video data may not be synchronized with the audio data, and may be transmitted to the remote attendee without corresponding synchronization information. In some cases, ambisonic channels may be encoded within the video stream and transmitted in standard channel-based audio (e.g., surround sound) audio channels, to be decoded and treated as ambisonic audio channels by the headset 202.

Figure 3:
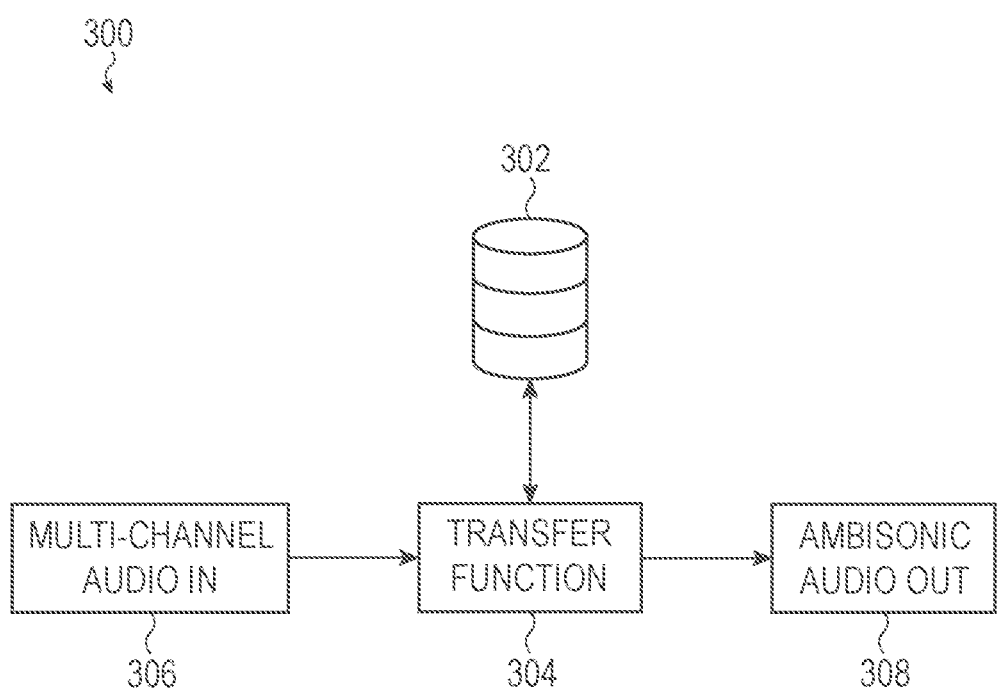
FIG. 3 depicts an example block diagram for modifying multi-channel audio input using one or more head-related transfer functions to produce an ambisonic audio stream.

FIG. 3 depicts an example block diagram for a system configured to modify multi-channel ambisonic audio stream using one or more head-related transfer functions to produce an ambisonic audio stream, as described herein.

As shown in an example block diagram 300, multi-channel ambisonic audio stream 306 may be received from a server. The ambisonic audio stream 306 may be generated from audio captured by at least one (ambisonic) microphone placed at a particular location at the host venue 100. For example, the ambisonic audio stream 306 may be processed through one or more transfer functions 304 for applying or determining a phase delay or other modification to adjust the production quality ambisonic stream received by the headset according to a user's head position at a given time. In other cases, an HRTF can be applied as well to impart binaural impressions to the user; in many cases, this may not be required.

As described herein, a remote attendee's unique cranial structure features, such as, a shape and a size of a remote attendee's head and/or torso, may change a frequency profile associated with each channel of multi-channel audio input when a remote attendee is present at a venue. Data corresponding to a remote attendee's cranial structure features may be stored in a database (or a memory) 302. The data may include or may be based on a 3D image of a remote attendee's head created using a camera and structured light pattern, and/or multiple images of a remote attendee's head taken from different angles.

Based on a remote attendee's unique cranial structure features stored in the database 302, one or more HRTFs may determine or update phase profile, e.g., phase delay, of one or more channels of multi-channel ambisonic audio stream 306. Accordingly, the produced ambisonic audio 308, in some embodiments, may thus provide a remote attendee specific unique audio experience to the remote attendee.

Figure 4:
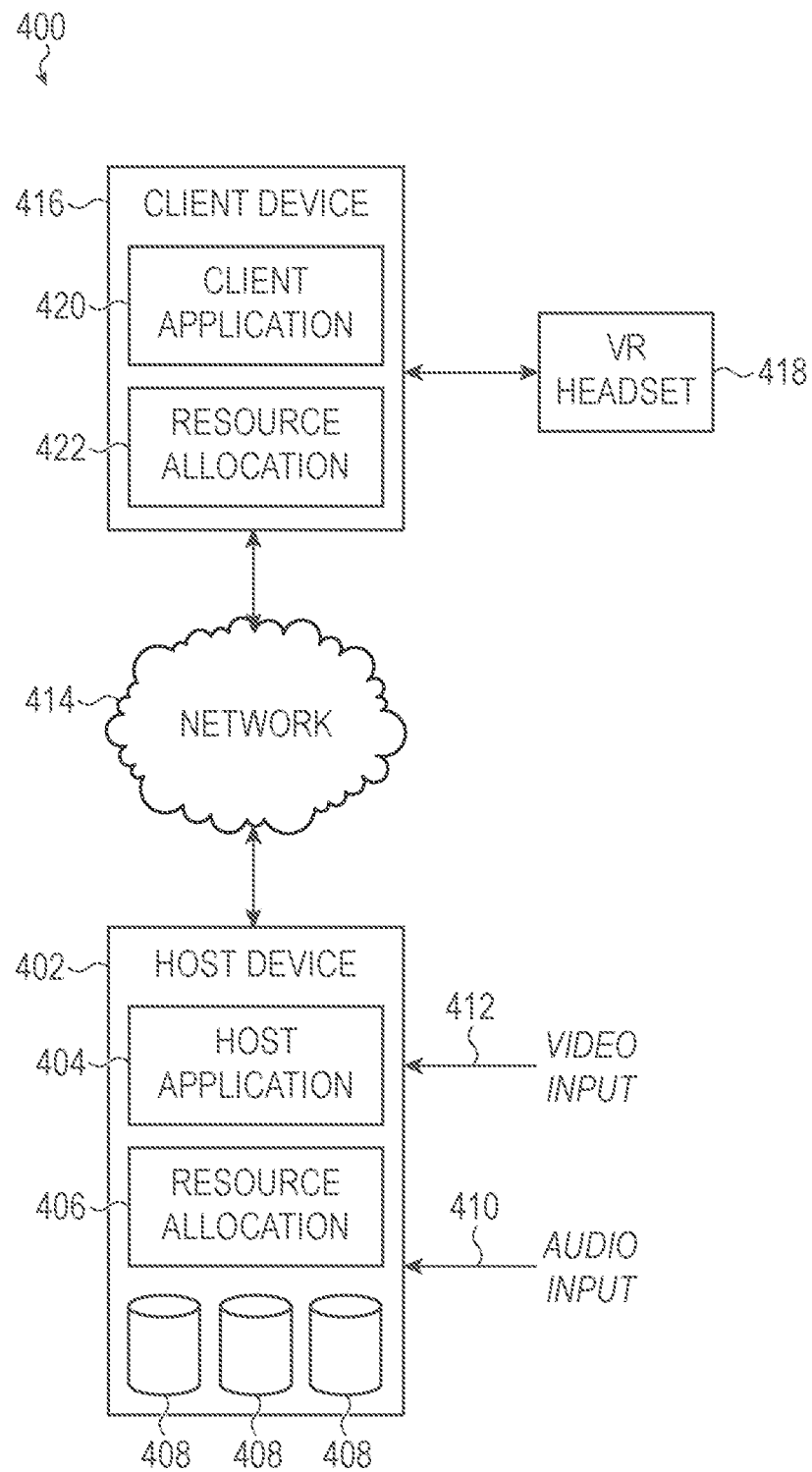
FIG. 4 depicts another network environment including a host-side computing device and one or more client-side computing devices.

FIG. 4 depicts another network environment including a host-side computing device and one or more client-side computing devices. As shown in FIG. 4, a network environment 400 may include one or more client devices 416 and/or 418, which may be communicatively coupled with a server or a host device 402 over a network 414. The server 402 may include a host application 404, and/or one or more resource allocation functions 406.

In some embodiments, and by way of a non-limiting example, the host application 404 may be a backend application (also referred to as a host service or a server application), which may be defined by executable code stored in a memory of, and executed by a processor of, the server or the host device 402, a server instance, or a service. In particular, as noted with respect to other embodiments described herein, the host device 402 may be supported by one or more virtual or physical hardware devices (co-located or geographical distributed), referred to herein as resource allocations 406, that may be leveraged to perform, coordinate, or otherwise instantiate one or more services or functions of the host device 402.

For example, a host device 402 as described herein may include a processor allocation, a memory allocation, and/or a network connection allocation that can be leveraged to instantiate the backend application. In particular, as with the frontend application (as discussed herein), the backend application may be defined by executable code and/or binary code stored in a persistent memory allocation.

A processor allocation can be configured to access the persistent memory allocation to retrieve the executable instructions and/or binary code and can be configured to load at least a portion thereof into a working memory allocation. With the support and assistance of the memory allocation, the processor allocation can instantiate the server application (in some examples, over an operating system) to facilitate interaction with, and use of document management system by one or more instances of the client application.

The host device 402 may receive video input 412 and audio input 410. The video input 412 may be received from the ambisonic audio capture system 104 that is equipped with an omnidirectional or multidirectional or wide-angle imaging system. The audio input 410 may be multi-channel ambisonic audio stream 306 as described herein. The host device 402 may also include one or more databases 408, which may be similar to the database 302. The database 302 may store a number of attendee profiles, and a number of venue profiles.

Each attendee profile of the number of attendee profiles may include information specific to a respective remote attendee, for example, including but not limited to, a virtual seat assigned to the remote attendee at the host venue 100, remote attendee's preference regarding a particular venue specific characteristics, and so on.

In some embodiments, and by the way of a non-limiting example, the database 408 may also store a venue-based profile, which identifies a specific attribute of the venue, including but not limited to, a size of the venue, a number of attendees who can attend an event, a type of building material, information about structures that may affect sound waves' propagation at the venue, and so on.

The host application 404 may process the video input 412 and the audio input 410. In particular, the host application 404 may process the audio input to generate the ambisonic audio output, as described herein in accordance with some embodiments, based on the one or more VTFs.

The host application 404 may transmit the generated ambisonic audio output to the one or more client devices 416 and/or 418 over the network 414, which may be a local area network (LAN), a wide area network (WAN), a cellular network such as a 3G network, a 4G or a long-term evolution (LTE) network, and/or a 5G network, and so on.

In some embodiments, and by way of a non-limiting example, the client device 416 may be a personal computer, a laptop, a phone, a smartphone, a tablet, and so on. The client device 418 may be an VR headset, which may be communicatively coupled with the network 414 directly and/or via the client device 416.

The client device 416 may include a client application 420 and one or more resource allocations 422. The client application 420 may be a frontend application, which may enable the remote attendee to provide the attendee specific profile information and store it in a memory or a database such as the database 302. The frontend application 420 may also enable the attendee to select and apply a particular venue specific configuration for generating the ambisonic audio output.

In particular, as noted with respect to other embodiments described herein, the client device 416 may be supported by one or more virtual or physical hardware devices (co-located or geographical distributed), referred to herein as resource allocations 422, that may be leveraged to perform, coordinate, or otherwise instantiate one or more services or functions of the client device 416.

For example, a client device 416 as described herein may include a processor allocation, a memory allocation, and/or a network connection allocation that can be leveraged to instantiate the frontend application. In particular, the frontend application may be defined by executable code and/or binary code stored in a persistent memory allocation.

A processor allocation can be configured to access the persistent memory allocation to retrieve the executable instructions and/or binary code and can be configured to load at least a portion thereof into a working memory allocation. With the support and assistance of the memory allocation, the processor allocation can instantiate the client application (in some examples, over an operating system) to facilitate interaction with, and use of the host application by one or more instances of the client application.

The AV headset 418 may present the ambisonic audio 306 as received from the host device 402. The AV headset 418 is described in detail below with reference to FIG. 5.

Figure 5:
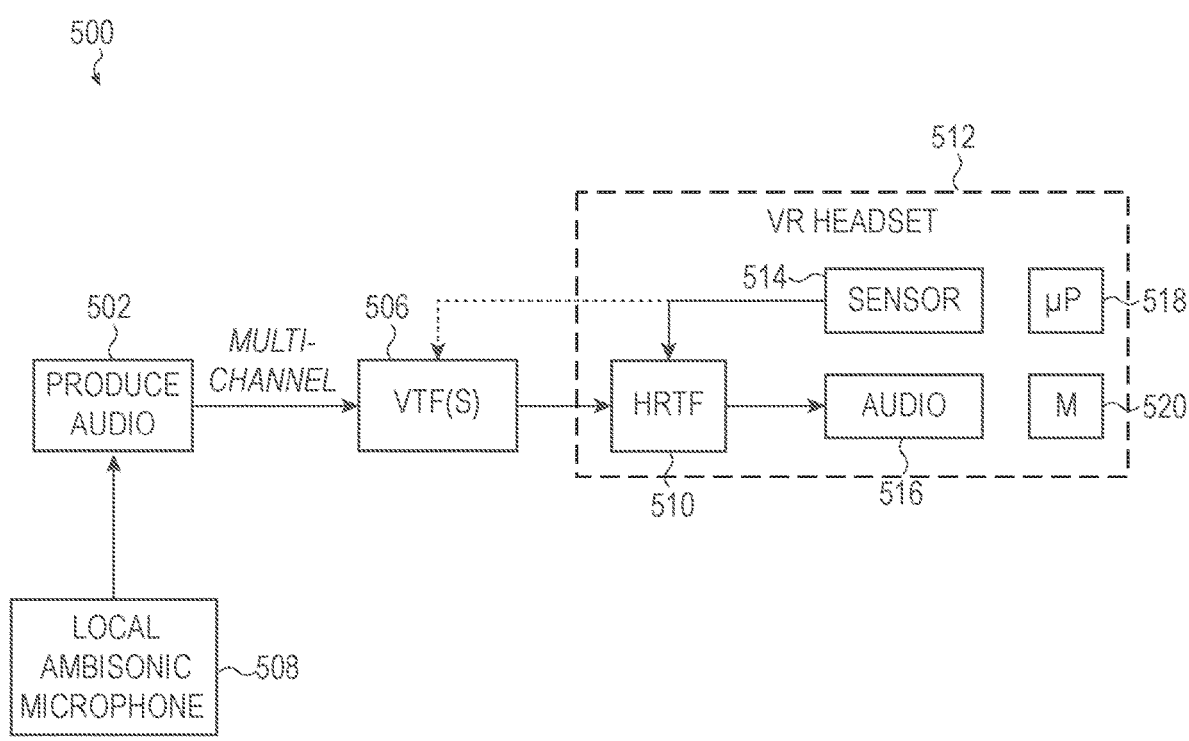
FIG. 5 depicts another example block diagram for modifying multi-channel audio input to produce an ambisonic audio stream.

FIG. 5 depicts another example block diagram for modifying multi-channel ambisonic audio stream to produce an ambisonic audio stream that is specific to a remote attendee. As shown in a block diagram 500, audio signals using at least one microphones 508, which may be an ambisonic microphone, located at a particular location in a venue may produce an ambisonic audio stream 502. The produced ambisonic audio stream 502 may be multi-channel ambisonic audio stream of n-order, as described herein.

As described herein in accordance with some embodiments, sound may travel differently at different venues. For example, a music concert being performed live, for example, at a first venue may have different frequency profile of the sound compared to the same music concert being performed live at a second venue due to unique building characteristics, including shape and size of a venue, material being used at a venue, and so on.

Accordingly, a phase delay, or a phase shift and other audio characteristics, as described herein, for each channel of the multi-channel ambisonic audio stream may be different for different venues. The phase delay, or phase shift, and/or other audio characteristics of one or more channels of the multi-channel ambisonic audio stream may be updated using a VTF 506, as described herein in accordance with some embodiments.

Further, an additional phase delay or phase shift of one or more channels of multi-channel ambisonic audio stream with a comparative phase delay or phase shift updated based on the VTF may be determined by a client device or a VR headset 512 using a HRTF 510. As described herein, the HRTF 510 may take into consideration a remote attendee's unique cranial structure features, as described herein in accordance with some embodiments.

An ambisonic audio output 308 may be generated by modifying one or more audio channels of multi-channel ambisonic audio stream having its audio characteristics, such as a phase delay and/or a gain adjustment, updated by VTF 506 and/or HRTF 510, before being played to a remote attendee (a user of the VR headset 512) according to head orientation or movement of the user.

The VR headset may include a microprocessor 518, a memory 520, an audio input 516, and a sensor 514. The microprocessor 518 may be a controller, a digital-signal-processor (DSP), an application-specific integrated circuit (ASIC), and/or a field-programmable gate array (FPGA), and so on. The memory 520 may be a static random-access memory or a dynamic random-access memory. The memory 520 may store instructions to be executed by the microprocessor 518 to detect a user's detected head orientation and/or user's movement to process through the HRTF 510 for generating the ambisonic audio stream 308 in accordance with a remote attendee's detected head orientation and/or movement using the sensor 514.

In some embodiments, and by way of a non-limiting example, the sensor 514 may be an inertial measurement unit (IMU) sensor, a gyroscope, an accelerometer, and/or a magnetometer, and so on. Accordingly, based on the remote attendee's movement as detected by the sensor 514, the HRTF 510 may dynamically update the phase delay or the phase shift and/or gain for one or more channels of the multi-channel ambisonic audio stream for a remote attendee's virtual location at the host venue 100.

Figure 6:
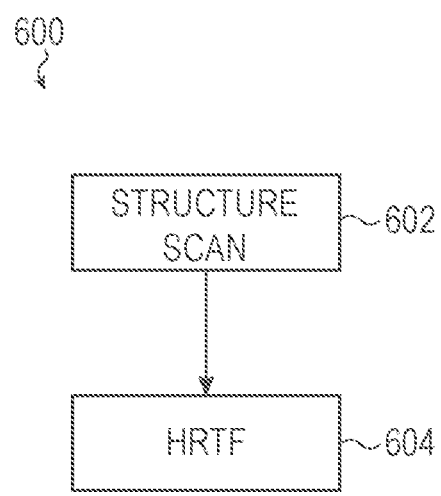
FIG. 6 depicts an example flow chart for generating a remote attendee specific ambisonic audio stream.

FIG. 6 depicts an example flow chart for generating a remote attendee specific ambisonic audio, in accordance with some embodiments. As shown in a flow chart 600, at 602, an attendee profiles of a remote attendee may be created by a user by taking multiple photos of a remote attendee's head from various angles. Based on the multiple photos a remote attendee's head taken from various angles, a remote attendee's unique cranial features, such as a skull size, size and shape of a remote attendee's ears, distance between a remote attendee's ears may be determined and stored as an attendee profile in a memory or a database of a client device or a VR headset. In some embodiments, a remote attendee's unique cranial structure features may be determined using a camera and a structured light pattern.

Using the camera and the structured light pattern, a facial scan or a three-dimensional (3D) image of a remote attendee's head may be created. Based on the 3D image of the remote attendee's head, the remote attendee's skull size, shape and size of the remote attendee's ears, distance between the attendee's ears may be determined, and stored in the attendee profile, which may be applied to the one or more HRTFs 604 for determining a required phase delay or phase shift update for one or more channels of the multi-channel ambisonic audio stream, as described herein.

In some embodiments, a remote attendee may select from a number of attendee profiles based on one or more images shown corresponding to each attendee profile of the number of attendee profiles. In other words, a user may select a particular attendee profile to apply to one or more HRTFs based on an image showing cranial structure similar to the remote attendee (that is a user of the client device of the VR headset).

Figure 7:
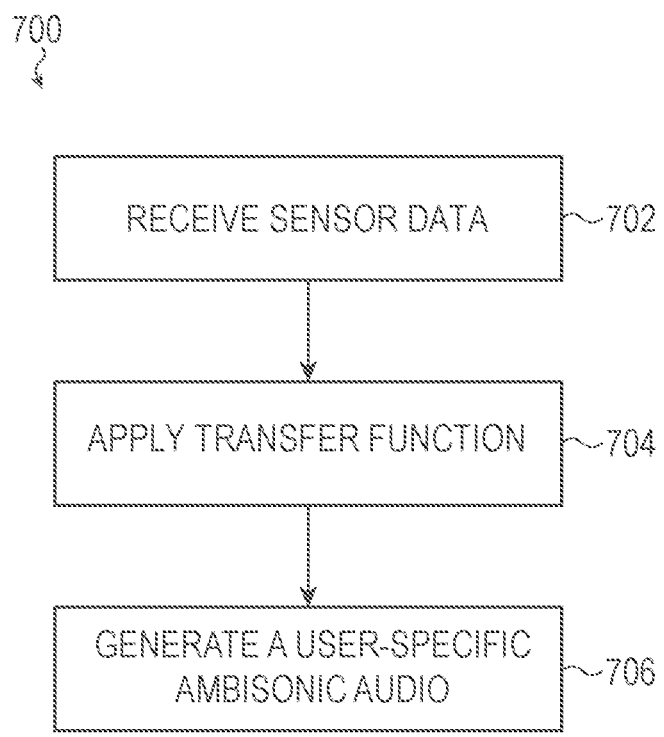
FIG. 7 depicts a yet another example flow chart for modifying an ambisonic audio stream for a remote attendee.

FIG. 7 depicts a yet another example flow chart for generating a remote attendee specific ambisonic audio stream. As shown in a flow chart 700, rendering an audio experience that is unique to the remote attendee which the remote attendee may have while attending an event in person may be based on receiving sensor data from a sensor in a client device or a headset (e.g., a VR headset 418 or 512) as shown in the flow chart 700 as 702. The sensor data may identify a remote attendee's movement, including but not limited to, head movement, eye movement, and so on using a sensor (e.g., the sensor 514). The sensor data may also identify a remote attendee's movement such as moving from one location in a room to another location in the room.

Based on the received sensor data, at 704, the client device may apply an HRTF to determine a relative phase delay or phase shift for one or more channels of a multi-channel ambisonic audio stream, as described herein in accordance with some embodiments. Once the relative phase delay or phase shift for soundwaves for one or more channels of a multi-channel ambisonic audio stream is determined, an ambisonic audio stream that is specific to a remote attendee for a remote attendee selected or a given venue may be generated, which is then rendered to the remote attendee using the client device or the headset at 706.

Figure 8:
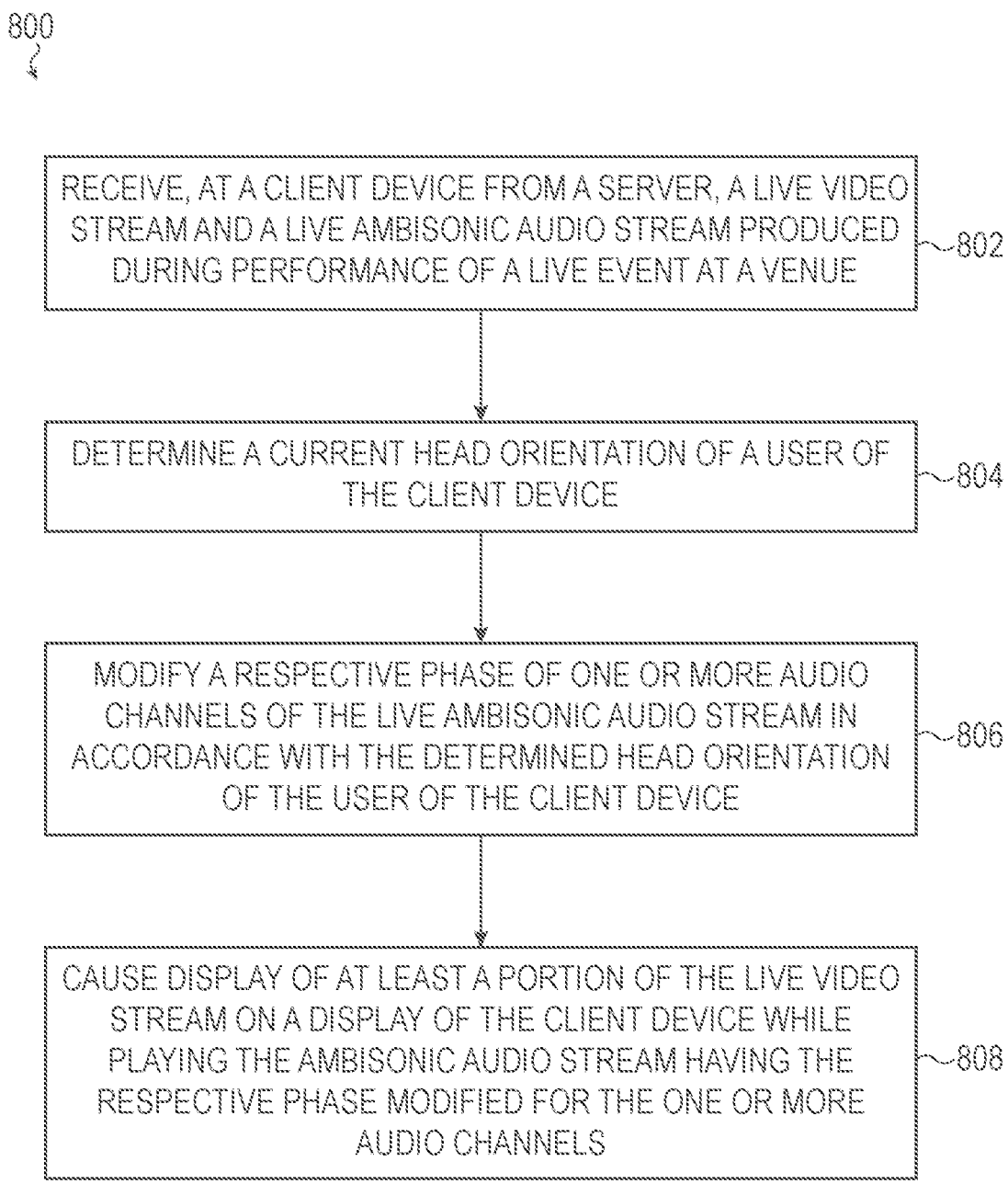
FIG. 8 depicts a flow chart for modifying a produced ambisonic audio stream in accordance with a user's head orientation or a user's movement.

FIG. 8 depicts a flow chart for generating an ambisonic audio stream at a client device in accordance with a user's head orientation or a user's movement. As shown in a flow chart 800, various method operations are performed by a client device or a headset (e.g., a VR headset 418 or 512) to provide a user of the client device of the headset, referred as a client device in general, an audio experience that is unique to user as a remote attendee of a live event being performed at a venue. At 802, the client device may receive a live video stream and a live ambisonic audio stream, which are captured and/or produced during a live performance of an event at a venue.

At 804, as the live video stream and the live ambisonic audio stream are received by the client device, the client device may determine a current head orientation details or movement details of a user of the client device. The head orientation details may include whether the user has turned his head left or right, or up or down, and so on. The movement details and/or the head orientation details of the user may be determined using a sensor included in the client device, which sensor may be an inertial measurement unit (IMU) sensor, a gyroscope, an accelerometer, and/or a magnetometer, and so on. In some embodiments, the movement details and/or the head orientation details of the user may be determined based on inputs from a number of imaging devices, such as cameras, disposed in the room in which the user is present.

At 806, in accordance with the determined movement and/or the head orientation of the user, a phase of one or more audio channels included in the ambisonic audio stream may be modified to accommodate changes in head position of the user. In some examples, in addition to modifying the respective phase of the one or more audio channels, a respective gain of the one or more audio channels may also be modified in accordance with the determined movement and/or the head orientation of the user.

In some embodiments, the live video stream and the live ambisonic audio stream may be synchronized with each other.

At 808, the client device may display at least a portion of the live video stream on a display of the client device while playing the ambisonic audio stream, which has been modified in accordance with some embodiments, as described herein, at 806. Accordingly, the ambisonic audio stream that is played to the user is in accordance with the movement of the user and/or orientation of the user's head, which may render a unique audio experience to the user of the client device as a remote attendee of the live event being performed at the venue.

Figure 9:
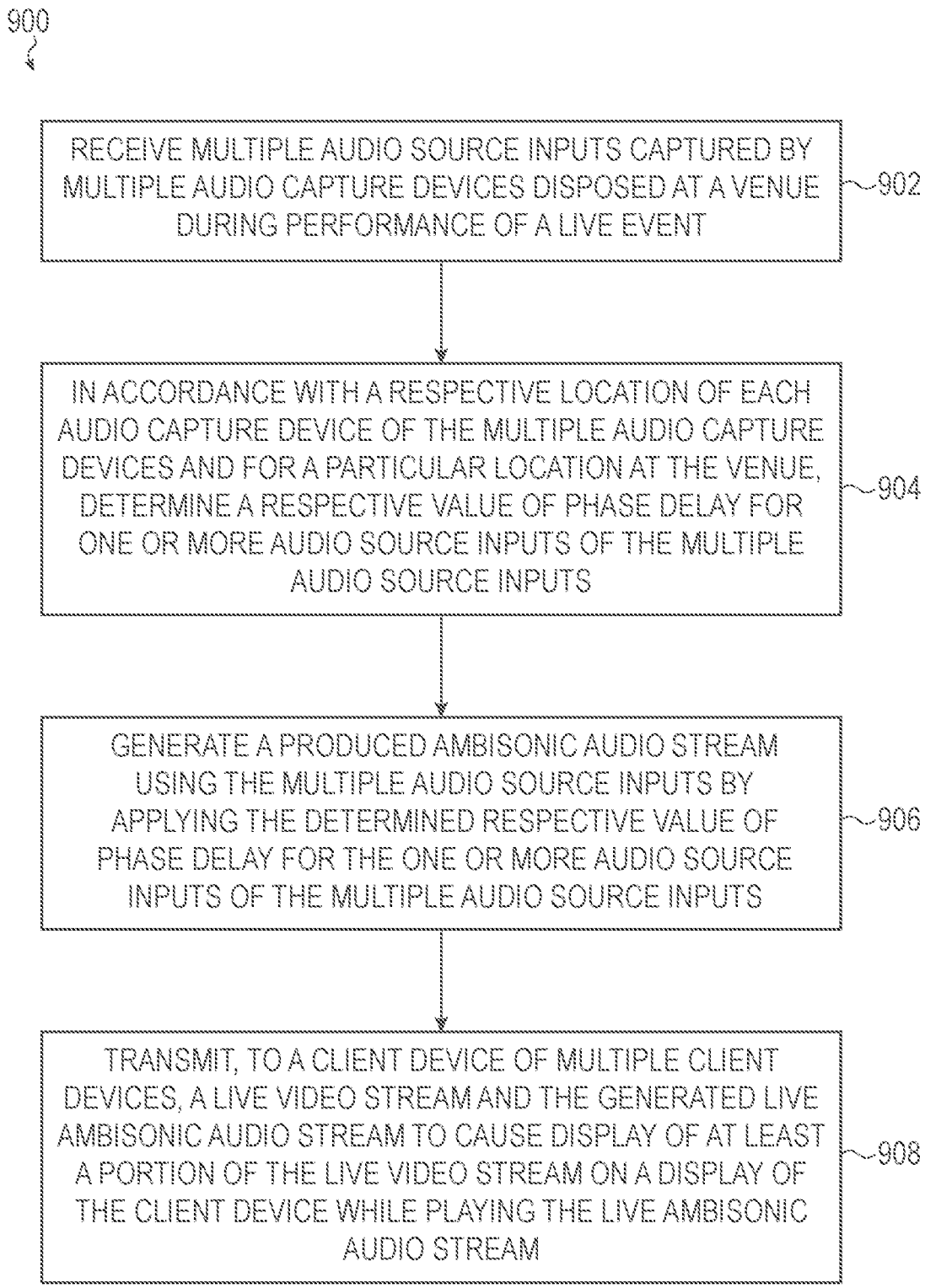
FIG. 9 depicts a flow chart for generating an ambisonic audio stream, at a server, for transmitting to a client device.

FIG. 9 depicts a flow chart for generating an ambisonic audio stream, at a server, for transmitting to a client device. As shown in a flow chart 900, various method operations are performed by a server or a computing device, which may be located at a venue where a live event is being performed and/or in a could networking system, to render an audio experience that is unique to a user of a client device as a remote attendee of the live event being performed at the venue.

The client device may be or may include or may be coupled to a VR headset. At 902, the server may receive a produced ambisonic audio stream, generated by mixing and phase/gain modification of captured audio captured by multiple audio capture devices disposed at a venue where a live event being performed.

Even though various audio capture devices are disposed at the venue at different locations, an audio input captured by each of the audio capture device may arrive at the server almost at the same time for performing any further processing with respect to the received audio inputs.

Accordingly, to create production quality ambisonic stream, at 904, a respective phase value of one or more audio channels captured by one or more audio capture devices of the multiple audio capture devices may be determined in respect of a particular location within the venue. In some cases, phase information can be determined by cross-correlating individual captured channels of audio (e.g., microphones, pickups, and so on) to channels recorded by an ambisonic microphone array placed at the particular location, probing a sound field local to that particular location.

At 906, a production quality ambisonic audio stream may be generated from the multiple audio source inputs received at the server by applying the respective value of phase delay for the one or more audio source inputs determined at 904.

Further, the live ambisonic audio stream generated may include multiple audio channels. By way of an example, a number of channels included in the generated live ambisonic stream may correspond with an order of the ambisonic stream, such as a first order ambisonic stream, a second order ambisonic stream, or a third order ambisonic stream, and so on. Further, as described herein, other audio characteristics (e.g., gain) may also be updated, as described herein.

At 908, the generated live ambisonic audio stream and/or a live video stream may be transmitted to one or more client devices to cause display of at least a portion of the live video stream on a respective display of the client device while playing the live ambisonic audio stream, as described herein, in accordance with some embodiments. By way of a non-limiting example, the live video stream and the live ambisonic audio stream may be transmitted to the one or more client devices as synchronized with each other.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

For example, although many embodiments described herein reference a live event, it may be appreciated that in many implementations, delays may exist and/or may be intentionally added. In other cases, it may be appreciated that the systems and methods described herein can be likewise applied to rebroadcast events; liveness and/or near-in-time broadcast/streaming is not required of all embodiments.

Further, it may be appreciated that in some examples, one or more settings or operations of a system as described herein can be modified, tuned, produced, or otherwise changed in real time. For example, a remote user may be able to leverage a mobile application executing and/or instantiated on a cellular phone to change how the audiovisual experience is presented to that particular remote user. For example, the user may be able to tune application of the HRTF, to change "simulated" venues by changing which VTFs are applied, and so on.

Further, it may be appreciated that other transforms and/or audiovisual effects can be applied to/over the stream(s) transmitted to an end user. For example, a live event in an outdoor venue may retain an option to overlay crowd noise, outdoor noise, or other effects.

In some cases, a microphone or microphone system positioned nearby an omnidirectional camera system as described herein may be used to captured ambient noise specifically to re-introduce that ambient noise to an HRTF-modified and/or VTF-modified set of audio streams/channels captured by recording equipment (e.g., microphones, pickups, and so on) that otherwise would not capture such ambient noise.

What is claimed is:

1. A client device comprising:
   at least one processor;
   at least one memory storing instructions, which when executed by the at least one processor, cause the at least one processor to:
   receive, from a server, a live video stream and a live ambisonic audio stream captured during performance of a live event at a venue, the live ambisonic audio stream including multiple audio channels generated from multiple audio source inputs captured by respective audio capture devices disposed at the venue;
   in accordance with a cranial structure characteristic of the user of the client device, modify the respective gain or the respective phase of the one or more audio channels of the live ambisonic audio stream determine a current head orientation of a user of the client device;
   in accordance with the determined head orientation of the user of the client device:
   modify a respective phase of one or more audio channels of the live ambisonic audio stream;
   cause display of at least a portion of the live video stream on a display of the client device while playing the ambisonic audio stream having the respective phase modified for the one or more audio channels.

2. The client device of claim 1, wherein the at least one processor is further configured to modify a respective gain of the one or more audio channels of the live ambisonic audio stream in accordance with the determined head orientation of the user of the client device.

3. The client device of claim 2, wherein the at least one processor is further configured to:
   detect the user of the client device has moved from a first location to a second location different from the first location; and
   modify the respective gain or the respective phase of the one or more audio channels of the live ambisonic audio stream further in accordance with corresponding to the detected location change of the user of the client device.

4. The client device of claim 3, wherein at least one processor is further configured to detect the movement of the user of the client device or the current head orientation of the user using an accelerometer or a gyroscope included in the client device.

5. The client device of claim 2, wherein the at least one processor is further configured to determine the respective gain or the respective phase of the one or more audio channels of the live ambisonic audio stream in accordance with a number of channels included in the received live ambisonic audio stream.

6. The client device of claim 1, wherein the live ambisonic audio stream includes at least four channels.

7. The client device of claim 1, wherein the live ambisonic audio stream is of a second or a higher order ambisonic audio stream.

8. A computing device, comprising:
   at least one processor; and
   at least one memory storing instructions, which when executed by the at least one processor, cause the at least one processor to:
   receive captured live ambisonic audio stream from multiple audio capture devices disposed at a venue during performance of a live event;
   in accordance with a respective location of each audio capture device of the multiple audio capture devices and for a particular location at the venue, determine a respective value of phase delay for one or more audio channels of the captured live ambisonic audio stream;
   generate a live ambisonic audio stream by applying the determined respective value of phase delay for the one or more audio channels of the captured live ambisonic audio stream; and
   transmit, to a client device of multiple client devices, a live video stream and the generated live ambisonic audio stream to cause display of at least a portion of the live video stream on a display of the client device while playing the live ambisonic audio stream, the client device modifying a respective gain or the respective phase of the one or more audio channels of the live ambisonic audio stream in accordance with a cranial structure characteristic of a user of the client device.

9. The computing device of claim 8, wherein the at least one processor is further configured to:
   synchronize the live video stream with the generated live ambisonic audio stream before transmitting the live video stream and the generated live ambisonic audio stream to the client device.

10. The computing device of claim 8, wherein the at least one processor is further configured to generate the live ambisonic audio stream including at least four channels.

11. The computing device of claim 8, wherein the at least one processor is further configured to generate the live ambisonic audio stream of a second or a higher order ambisonic audio stream.

12. The computing device of claim 8, wherein the at least one processor is further configured to determine the respective value of phase delay for the one or more audio source inputs of the multiple audio source inputs based on venue-specific characteristics of the venue.

13. The computing device of claim 12, wherein the venue-specific characteristics of the venue include at least one or more of: a size of the venue, an architectural structure of the venue, or a seating capacity of the venue.

14. The computing device of claim 12, wherein the particular location at the venue is selected in response to a user input.

15. The computing device of claim 8, wherein:
the particular location at the venue is a first location at the venue;
the respective value of phase delay for the one or more audio source inputs of the multiple audio source inputs is a first set of phase delays;
the live ambisonic audio stream is a first live ambisonic audio stream;
the client device is a first client device; and
the at least one processor is further configured to:
in accordance with a respective location of each audio capture device of the multiple audio capture devices and for a second location at the venue, determine a second set of phase delays, the second set of phase delays including another respective value of phase delay for the one or more audio source inputs of the multiple audio source inputs; and
generate a second live ambisonic audio stream using the multiple audio source inputs by applying the second set of phase delays to the one or more audio source inputs of the multiple audio source inputs; and
transmit, to a second client device of multiple client devices, the live video stream and the generated second live ambisonic audio stream to cause playing of the second live ambisonic audio stream on the second client device while displaying the live video stream on the second client device.

16. A method comprising:
receiving, at a client device from a server, a live video stream and a live ambisonic audio stream captured during performance of a live event at a venue, the live ambisonic audio stream including multiple audio channels generated from multiple audio source inputs captured by respective audio capture devices disposed at the venue;
modify, by the client device, at least one of the one or more audio channels based at least in part on a head-related transfer function specific to a user of the client device;
determining, by the client device, movement details of the user of the client device;
in accordance with the determined movement details of the user of the client device:
modifying a respective phase of one or more audio channels in the live ambisonic audio stream; and
causing display of at least a portion of the live video stream on a display of the client device while playing the ambisonic audio stream having the respective phase modified for the one or more audio channels.

17. The method of claim 16, wherein the movement details of the user include movement details of a head of a user of the client device.

18. The method of claim 16, wherein the movement details of the user include movement of a user of the client device from a first physical location to a second physical location in a room.

19. The method of claim 16, further comprising:
in accordance with the determined movement details of the user of the client device, further modifying the one or more audio channels in the ambisonic audio stream with respect to a corresponding gain of the one or more audio channels in the ambisonic audio stream.

* * * * *